June 24, 1930. H. L. JOHNSTON ET AL 1,767,000
FOOD HANDLING APPARATUS
Filed Aug. 2, 1927 3 Sheets-Sheet 1

INVENTORS.
Herbert L. Johnston
BY David A. Miller
Marechal Noe
ATTORNEYS.

June 24, 1930.  H. L. JOHNSTON ET AL  1,767,000
FOOD HANDLING APPARATUS
Filed Aug. 2, 1927  3 Sheets-Sheet 2

INVENTORS
Herbert L. Johnston
BY David A. Marker
Macklin & Mac
ATTORNEYS.

Patented June 24, 1930

1,767,000

UNITED STATES PATENT OFFICE

HERBERT L. JOHNSTON AND DAVID A. MEEKER, OF TROY, OHIO, ASSIGNORS TO THE HOBART MANUFACTURING COMPANY, OF TROY, OHIO, A CORPORATION OF OHIO

FOOD-HANDLING APPARATUS

Application filed August 2, 1927. Serial No. 210,146.

This invention relates to food handling apparatus.

One of the principal objects of the invention is the provision of an improved candy pulling mechanism; and particularly such mechanism adapted to be detachably connected to an operating device, such as a food handling machine.

Another object of the invention is the provision of a novel candy pulling mechanism having a plurality of candy pulling arms revoluble in intersecting circles, and embodying supporting and driving means located at the same side of the various arms.

A further object is the provision of an attachment unit of this character embodying two U-shaped candy pullers one of which is attached to a driven shaft at a point on the bight portion of the U and the other having an extension of one of the legs of the U which is fastened to a corresponding driven shaft.

Still further objects and advantages of the invention will be apparent from the following description and from the drawings.

In the drawings Fig. 1 is a plan view, partly in section, of an attachment unit embodying the present invention;

Figure 1:
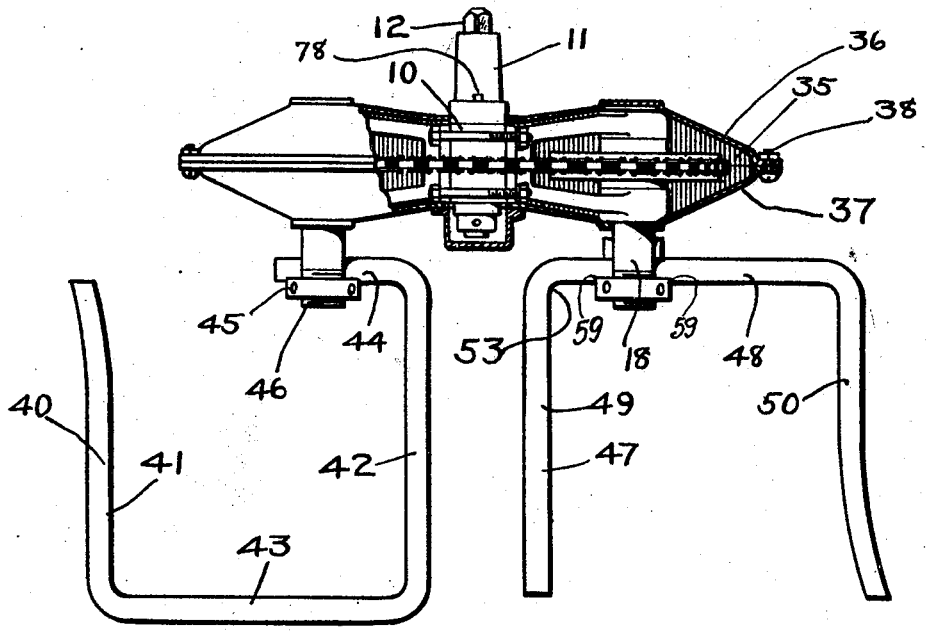
Figure 2:
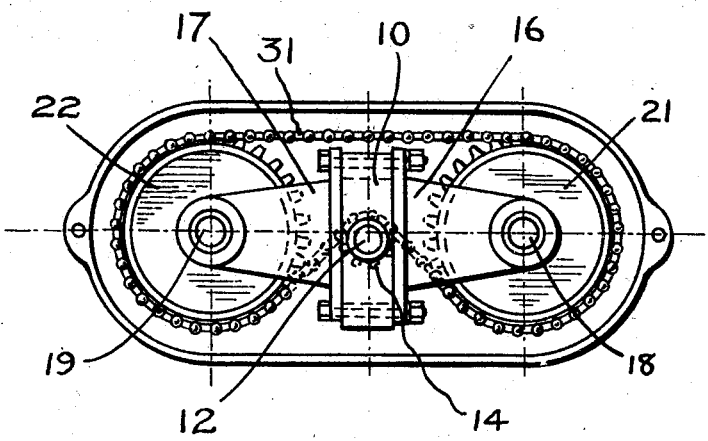
Fig. 2 is an elevational view of the attachment shown in Fig. 1 showing one side of the housing removed.
Figure 4:
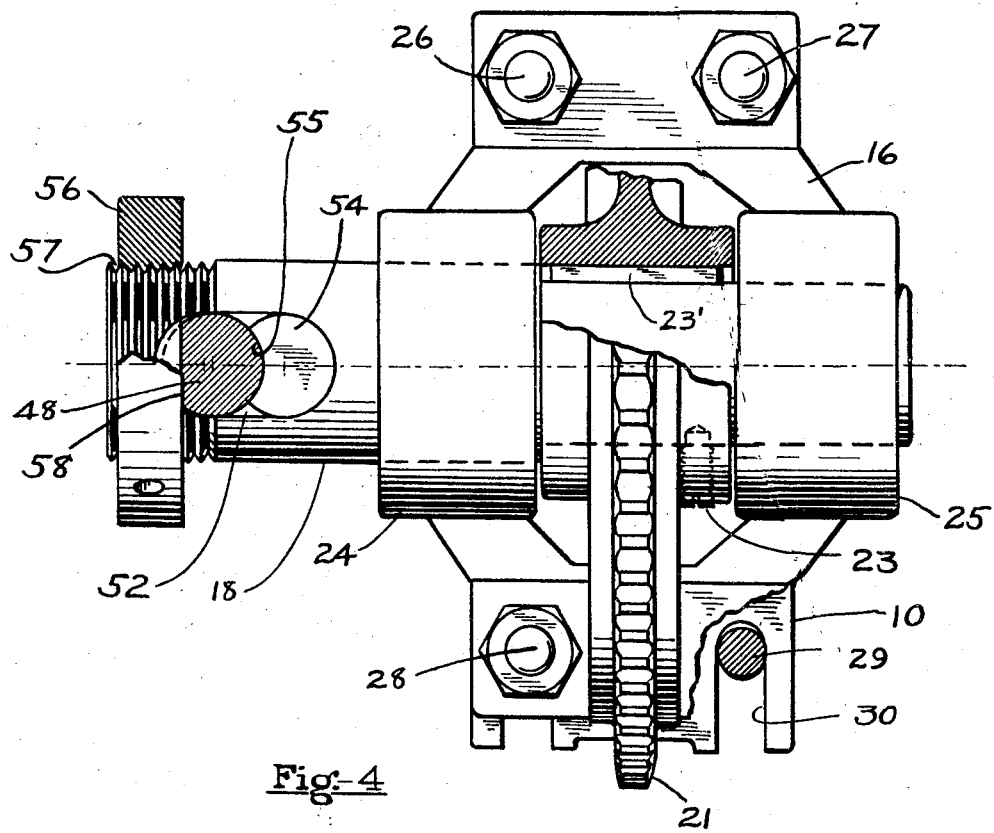
Fig. 4 is a side elevation of the attachment, with the housing removed.

Referring more particularly to the drawings by reference numerals in which corresponding numerals designate like parts in the various views, the candy pulling attachment unit, shown in Fig. 1, embodies a support 10 having at its rear end a hub 11, these two parts rotatably suporting a drive shaft 12. The drive shaft supports and rotates a drive sprocket gear 14. On opposite sides of the support 10 are the pillow blocks 16 and 17 which rotatably support the short driven shafts 18 and 19 respectively which extend parallel to and on opposite sides of the drive shaft 12. Two driven sprocket gears 21 and 22 are mounted respectively on the short shafts 18 and 19 and are fastened to these shafts by set-screws 23 and keys 23' as shown in Fig. 4. The pillow blocks are bifurcated so as to provide opposing bearing sections 24 and 25 between which the driven sprocket gears are located. The pillow blocks are fastened in an adjustable manner to the support 10 by means of through bolts 26, 27, 28 and 29 which extend through vertical slots 30 in the support so as to fasten the two pillow blocks on opposite sides thereof in an adjustable manner permitting the vertical movement or adjustment of the pillow blocks in relation to the support. A single drive chain 31 extends partly around the drive and driven sprocket gears, and this chain may thus be tightened to compensate for wear of the chain. It will be obvious that a vertical downward movement of the pillow blocks in relation to the support will cause the chain to be tightened and after the tightness is suitably adjusted in the driving chain, the through bolts 26 to 29 inclusive are tightened in place and the various parts are thus held rigidly together in their proper positions.

The driving connection between the drive shaft 12 and the short driven shafts 18 and 19 is enclosed by a two-part housing 35 having sections 36 and 37 attached together along a central plane by means of the fastening bolts 38. These two sections are attached in any suitable manner to the support 10.

The housing section 37 is provided with two holes in the forward side thereof through which the two shafts 18 and 19 project. The shaft 19 projects a short ways from the side of the housing and supports a candy puller 40 which embodies the two pulling arms 41 and 42 and a connecting bar 43 which together form a U-shaped member. The arm 42 projects inwardly as shown at 44 and this inward projection extends transversely through an end portion of the shaft 19 and is held firmly in place by a fastening nut 45 which fastens on the threads 46 with which the end of this driven shaft is provided. The nut 45 thus holds the U-shaped candy puller arm in position so that it may rotate with the drive shaft and cooperate with the adjacent candy puller arm 47 which is attached to the driven shaft 18. This candy puller 47 is also of general U-shape but the connecting bar 48 which connects the two arms 49 and 50 is itself fastened to the driven shaft 18. The connection between the puller 47 and shaft 18 is shown in Fig. 4, the shaft having a slot 52 which is elongated as shown and of a width to neatly receive the diameter of the rod of which the puller 47 is formed. The slot is elongated as shown so that the bend 53 of the puller may be passed through the slot to permit the assembly or disassembly of the candy puller with the driven shaft 18. After the arm 49 and the bend 53 of the candy puller have been passed through the elongated slot the bar 48 is moved to its correct position in the slot and a filler block 54 having a forward side 55 curved to fit the rear of the bar 48 is inserted within the slot. The fastening nut 56 is then threaded on the screw threads 57 on the end of the shaft and against the candy puller arm to prevent the movement of the arms in relation to the driven shaft 18. The bar 48 is cut away to provide a flat bottom recess, as shown at 58, adjacent the portion which is fastened to the driven shaft. This flat bottom of the recess cooperates with the flat face of the lock nut 56—and this cut away portion is of such extent as to receive the lock nut thus providing shoulders 59 which hold the bar against sliding. The flat portion holds the otherwise round bar against turning. As is evident from Fig. 1 of the drawing, the part 44 of the other candy puller arm is also provided with a flat bottom recess which cooperates with the nut 45 to lock this arm against both rotary and transverse motion. The fastening nut 56 thus bears tightly against the flattened portion 58 of the candy puller to firmly fix the latter in position on the shaft so that it may cooperate with the opposing candy puller 40 in an obvious manner.

Figure 3:
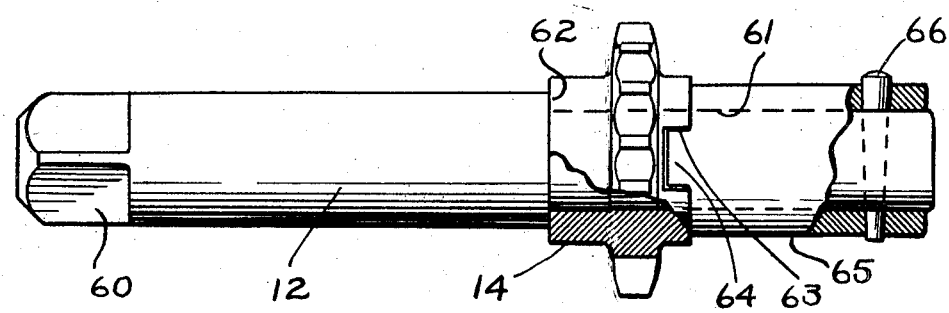
Fig. 3 is a detail view partly in section showing the driving connection between the drive shaft and the drive sprocket.

The drive shaft 12, as shown in Fig. 3, has one end provided with driving surfaces 60 by means of which power is supplied to cause the rotation of the shaft. Between its ends the shaft rotatably supports the drive sprocket 14, which is mounted on a reduced portion 61 of the shaft and bears against the shoulder 62 so that it is prevented from moving towards the left as seen in Fig. 3. The drive sprocket 14 is provided with cut out jaw notches 63 in which fit the jaws 64 of a sleeve 65 which has an inner bore fitting the reduced portion 61 of the shaft so that a running fit is provided between these two parts. The sleeve 65 is fixed to the shaft by a drive pin 66, preferably tapered, which extends through both sides of the sleeve to fix the same on the shaft and hold the drive sprocket fixed in place on the shaft. It is thus apparent that a power is supplied to the end of the shaft through the drive surfaces 60, the shaft 12, acting through the pin 66 and the sleeve 65 will cause the sprocket wheel 14 to be rotated with the shaft, the pin 66 providing a connection which may be sheared in case excessive strains are imposed upon the machine parts. If the pin is sheared it will be obvious that the drive sprocket 14 will remain stationary, the shaft 12 merely rotating freely within the latter.

Figure 5:
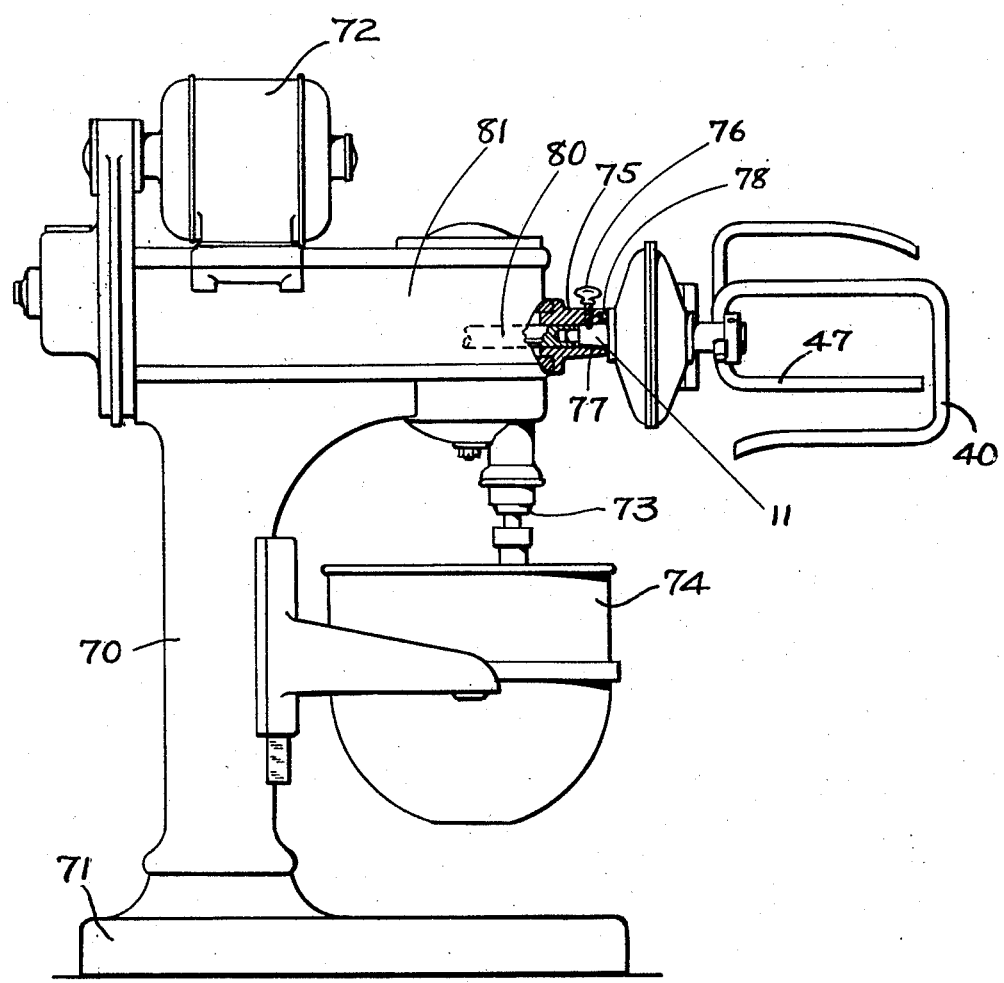
Fig. 5 is a side elevation of a food handling machine with the candy pulling attachment in place.

The attachment unit just described is adapted to be used in conjunction with a food handling machine as shown in Fig. 5. This machine is of the motor driven type and, as shown, embodies a pedestal 70 extending upwardly from the base 71. The pedestal supports an electric motor 72 which is in driving connection with suitable beating, stirring or cutting apparatus designated generally 73, the bowl or container 74 holding the food which is being operated upon. This food handling machine may also be provided with other devices of a different character from the apparatus 73 adapted to operate in various manners upon different types of food. The machine, however, is provided with an attachment socket 75 conveniently located and fastened on the side of the main housing 81 of the machine. The candy pulling unit is adapted to be quickly and detachably fastened to the socket 75 and for this purpose the socket is provided with an internal taper 77 in which the tapered hub 11 of the candy pulling attachment fits. The support 10 of this attachment has a top locating pin 78 which fits in a corresponding hole at the top of the socket to prevent rotational movements of the support and of the other stationary portions of the attachment unit. Suitable means such as a thumb-screw 76 may be used to fasten the hub portion 11 firmly in place within the socket 75. When the hub portion is in operative position, fastened within the socket, the end of the drive shaft 12 will extend into a driving socket on the end of one of the motor operated shafts 80 within the main housing or body part 81 of the machine, the rotatable member 80 having an end which is socketed to provide driving surfaces which engage with the driving surfaces previously referred to on the end of the drive shaft 12.

It will be apparent that when the candy puller is not needed it may be quickly disconnected from the food handling machine by merely operating the thumb-screw and pulling the attachment unit to withdraw the end of the shaft from driving engagement with the motor driven member within the machine. When attached in place the two candy pullers operate in conjunction with one another as they are rotated by the short driven shafts on which they are mounted, to effectively operate upon the candy or other material which they are adapted to handle. The construction of the pulling arms in the manner previously described permits a light construction which is highly desirable in a portable device of the character set forth herein.

While the form of apparatus herein described constitutes a perferred embodiment of the invention, it is to be understood that the invention is not limited to this precise form of apparatus, and that changes may be made therein without departing from the scope of the invention which is defined in the appended claims.

What is claimed is:

1. A candy-pulling apparatus of the character described comprising a drive shaft, a support on which said drive shaft is rotatably mounted, a pair of short driven shafts in driving connection with said drive shaft, supporting means for said short shafts, means for adjustably fastening said supporting means on said support to compensate for wear of said driving connection, and U-shaped candy pullers attached to the end portions of said short shafts.

2. Food-handling apparatus of the character described comprising a drive shaft, a support in which said drive shaft is rotatably mounted, a hollow housing supported by said support, a pair of short driven shafts within said housing, a gear on each of said short shafts and on said drive shaft, a chain interconnecting said gears for simultaneous rotation, said chain being enclosed by said housing, and candy-puller arms on each of said driven shafts.

3. A candy-pulling unit adapted to be detachably connected to a motor driven food-handling machine comprising a portable support, a drive shaft rotatably mounted in said support, a pair of spaced driven shafts connected to said driving shaft and mounted on said support, cooperating food-handling arms fixed to said driven shafts and positioned both at the same side of said support, said drive shaft and said support having provisions for quick detachable connection respectively to a power shaft and to the frame of a food-handling machine.

4. A candy-pulling attachment unit adapted to be detachably connected to a food-handling machine comprising a stationary support, a drive shaft rotatably mounted within said support, a pair of spaced driven shafts mounted in said support parallel to said driving shaft, gears on said drive and driven shafts, a chain interconnecting said gears and a sectional enclosing housing attached to said support and enclosing said gears and chain, means on one end of said drive shaft and on the adjacent portion of said support for fastening said drive shaft and said support to corresponding rotatable and fixed members of a food-handling machine, and candy-puller arms on said driven shafts.

5. A candy-pulling attachment unit adapted to be detachably connected to and operated from a food-handling machine comprising a stationary support, a drive shaft rotatably mounted in said support having an exposed end, a pair of spaced driven shafts mounted parallel to said drive shaft, interconnected drive gears on said drive and driven shafts, a two-part enclosing housing enclosing said drive gears, pulling arms on said driven shafts, means on the exposed end of said drive shaft and on the adjacent portion of said support for fastening said drive shaft and said support to corresponding rotatable and fixed members of a food-handling machine, and wear-compensating means for adjusting said driven shafts in relation to said drive shaft.

6. In a candy-pulling apparatus, a pair of spaced driven shafts, means for driving said shafts, a pair of arms each fastened directly to one of said shafts, and a second pair of arms only one of which is fastened directly to the other of said shafts, said second pair of arms being both spaced from their shaft axis and attached together so that the arm which is directly fastened forms a drive means for the other.

7. In a food-handling apparatus of the character described, a pair of driven shafts, means for driving said shafts, a U-shaped piece attached at the bight portion of the U to an end part of one of said shafts, and a second U-shaped piece having an inward extension at the free end of one arm thereof which is attached to an end part of the other of said shafts.

8. Food-handling apparatus of the character described comprising a detachable portable unit adapted to be detachably affixed to a motor driven food-handling machine and comprising a support, attaching means for fastening said support in place, a drive shaft rotatably mounted on said support and having an exposed end adapted to be moved into engagement with a driven member of said machine, a housing supported by and enclosing said support, and food-handling members adapted to be driven from said shaft.

9. A candy-pulling unit comprising a support, adjacent driven shafts mounted on said support, drive means for said driven shafts, and rotatable substantially U-shaped candy pullers extending from each driven shaft so as to be revolved by said driven shafts and positioned both at the same side of said support in overhanging relation therewith, each candy puller having a pair of arms spaced different distances from the axis of the shaft on which they are mounted so that the arms all move in circular paths, with the arms spaced farther from the shaft axes traveling in intersecting circles.

10. In apparatus of the character described, a driven shaft exteriorly threaded at one end and having a closed slot therein spaced from the end thereof, a lock nut threaded on the exterior of said driven shaft, and a candy-puller arm removably positioned within said slot and locked therein by said nut, said arm having a cut away portion on the exterior of said slot to receive said nut when in locking position.

11. In apparatus of the character described, a drive shaft, a driven shaft exteriorly threaded at one end and having a closed slot therein spaced from the end thereof, a lock nut threaded on the exterior of said driven shaft, and a round candy-puller arm removably positioned within said slot and locked therein by said nut, said arm being recessed on the exterior of said slot to receive the nut, the said recessed portion providing a flat face for cooperation with the nut to lock the arm against transverse movement and rotary movement.

12. In apparatus of the character described, a drive shaft, a driven shaft threaded at one end and having a closed slot therein spaced from the end thereof to receive a sharply curved candy-puller arm, said slot being of sufficient depth to permit the sharply curved portion of the arm to be inserted therethrough, a lock nut threaded on said driven shaft, and a candy-puller arm removably positioned within said slot, and a fillet piece positioned within said slot behind said arm, said arm being recessed to receive the lock nut, said recessed portion being provided with a flat face against which the nut may be turned to urge the said arm against the fillet, to lock the arm against transverse movement and rotary movement thereof.

13. Food-handling apparatus of the character described comprising a support, spaced shafts mounted therein, means for driving said shafts, and a candy puller on the end of each shaft extending from said shafts away from the same side of the support, each candy puller comprising a pair of arms spaced different distances from their shaft axis so all the arms move in circular paths, with the arms spaced farther from the shaft axis traveling in intersecting paths.

14. Food-handling apparatus of the character described comprising a support, spaced shafts mounted therein, means for driving said shafts at the same speed and in the same direction, and a pair of candy-puller arms on each shaft extending from the shafts away from the same side of the support, the pair of arms of each shaft being spaced different distances from their shaft axis so all the arms move in circular paths, with the arms spaced farther from the shaft axes traveling in intersecting paths and the two arms spaced closer to the shaft axes being movable in non-intersecting paths.

15. Food-handling apparatus of the character described comprising a portable support, a drive means in said support, spaced shafts mounted on said support, means interconnecting said drive means and said shafts, means for adjusting the position of one of said shafts in relation to said support, and a pair of candy-puller arms of each shaft extending from said shafts away from the same side of the support, the pair of arms of each shaft being spaced different distances from their shaft axis so all the arms move in circular paths, with the arms spaced farther from the shaft axis traveling in intersecting circles.

16. Food-handling apparatus of the character described comprising a drive shaft, a support therefor, driven shafts, means adjustable on said support for holding said driven shafts, a single drive chain operatively interconnecting the said shafts, candy pullers on said driven shafts extending from said support, said means being adjustable downwardly to tighten said chain so that gravitational pull on said means moves it to properly tension the chain, and provision for holding said means in adjusted position.

17. In apparatus of the character described, a drive shaft, a driven shaft having a closed slot therein spaced from the end thereof, an integral substantially U-shaped candy puller extending through the closed slot in said driven shaft, said slot being of sufficient depth to permit said U-shaped candy puller to be inserted within the slot until the bight portion thereof is positioned within the slot, and means for locking the bight portion of said candy puller in position against movement in respect to said shaft.

18. Food handling apparatus of the character described comprising a support, a drive shaft mounted therein, driven shafts one on each side of said drive shaft, a block supporting each driven shaft and adjustably mounted on said support, candy pullers on said driven shafts, each candy puller having two arms spaced different distances from their shaft axes so that all the arms move in circular paths with the arms spaced farther from the shaft axes traveling in intersecting circles, and a single drive chain interconnecting said drive shaft and both of said driven shafts, the adjusting means for said driven shafts permitting adjustment to take up slack in the drive chain while maintaining the center lines of the driven shafts at substantially the same distance apart.

19. A candy pulling apparatus of the character described comprising a driven shaft having an externally threaded outer end with a transverse closed slot therethrough adjacent but spaced from the outer end thereof, an integral substantially U-shaped candy puller inserted within said closed slot until its bight portion extends through said slot, said slot being substantially larger in the direction of the length of the U than the said bight portion, a filler within said slot, and a locking member threaded on the externally threaded outer end of said driven shaft for locking said candy puller in position against the filler block within said slot to prevent transverse movement and rotary movement of the candy puller within said slot.

In testimony whereof we hereto affix our signatures.

HERBERT L. JOHNSTON.
DAVID A. MEEKER.